US012133171B2

(12) United States Patent
Gulbay et al.

(10) Patent No.: US 12,133,171 B2
(45) Date of Patent: *Oct. 29, 2024

(54) SYSTEM AND METHOD FOR MACHINE LEARNING APPLIED TO IN-BAND TO OUT-OF-BAND COMMUNICATIONS MANAGEMENT

(71) Applicant: Dell Products, LP, Round Rock, TX (US)

(72) Inventors: Sinem Gulbay, Austin, TX (US); Carlton A. Andrews, Austin, TX (US)

(73) Assignee: DELL PRODUCTS LP, Round Rock, TX (US)

( * ) Notice: Subject to any disclaimer, the term of this patent is extended or adjusted under 35 U.S.C. 154(b) by 202 days.

This patent is subject to a terminal disclaimer.

(21) Appl. No.: 17/189,146

(22) Filed: Mar. 1, 2021

(65) Prior Publication Data

US 2021/0185615 A1 Jun. 17, 2021

Related U.S. Application Data

(63) Continuation of application No. 16/176,998, filed on Oct. 31, 2018, now Pat. No. 10,939,380.

(51) Int. Cl.
*H04W 52/02* (2009.01)
*H04W 4/021* (2018.01)
(Continued)

(52) U.S. Cl.
CPC ....... *H04W 52/0251* (2013.01); *H04W 4/021* (2013.01); *H04W 12/08* (2013.01);
(Continued)

(58) Field of Classification Search
None
See application file for complete search history.

(56) References Cited

U.S. PATENT DOCUMENTS 10,541,865 B1 * 1/2020 Brophy ............... H04L 41/083
2005/0223248 A1 * 10/2005 Lim ...................... G06F 21/305
713/300

(Continued)

*Primary Examiner* — Adnan Baig
(74) *Attorney, Agent, or Firm* — Prol Intellectual Property Law, PLLC; H. Kenneth Prol

(57) ABSTRACT

An information handling system operating a low power communications engine comprising a wireless adapter for communicating on a low power communication technology network for receiving low power communication technology data traffic for at least one always-on remote management service for the information handling system, a controller receiving a location status of the information handling system via the low power communication technology network indicating a location or network, where the controller executes code instructions for a low power communications engine to assess a location trust level from an environment characteristics analysis engine to determine whether the location status is a trusted zone location or an untrusted zone location utilizing binary classification machine learning based on input variables including data relating to history of activity at the location or on the network learned by the environment characteristics analysis engine from reported operational or network activity, and the controller to trigger an embedded controller to wake a BIOS of the information handling system and forward the incoming low power communication technology data traffic to in-band applications on the information handling system if the information handling system location status is determined to be in one trusted zone location and the controller to ignore the received low power communication technology data traffic if the information handling system location status is in one untrusted zone location.

20 Claims, 5 Drawing Sheets

(51) Int. Cl.
  *H04W 12/08* (2021.01)
  *H04W 12/63* (2021.01)
  *H04W 48/04* (2009.01)
  *H04W 64/00* (2009.01)

(52) U.S. Cl.
  CPC ........... *H04W 12/63* (2021.01); *H04W 48/04* (2013.01); *H04W 52/0229* (2013.01); *H04W 52/0235* (2013.01); *H04W 52/0264* (2013.01); *H04W 64/00* (2013.01)

(56) References Cited

U.S. PATENT DOCUMENTS

| | | | |
|---|---|---|---|
| 2010/0107238 A1* | 4/2010 | Stedman | G06F 21/335 |
| | | | 726/13 |
| 2013/0139245 A1 | 5/2013 | Thomas | |
| 2016/0073271 A1* | 3/2016 | Schultz | H04W 64/003 |
| | | | 455/410 |
| 2017/0270301 A1* | 9/2017 | Vidyadhara | G06F 9/4411 |
| 2019/0138716 A1* | 5/2019 | Huang | H04L 41/0686 |

\* cited by examiner

SYSTEM AND METHOD FOR MACHINE LEARNING APPLIED TO IN-BAND TO OUT-OF-BAND COMMUNICATIONS MANAGEMENT

This application is a continuation of prior application Ser. No. 16/176,998 entitled "SYSTEM AND METHOD FOR MACHINE LEARNING APPLIED TO IN-BAND TO OUT-OF-BAND COMMUNICATIONS MANAGEMENT," filed on Oct. 31, 2018, which is assigned to the current assignee hereof and is incorporated herein by reference in its entirety.

FIELD OF THE DISCLOSURE

The present disclosure generally relates to a method and apparatus for communication power management for always-on communications through a low power wide area network (LPWAN) radio system and front end used with information handling systems.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handling systems can also implement various virtualized architectures. Data communications among information handling systems may be via networks that are wired, wireless, optical or some combination. For wireless communications, one or more wireless interface adapters may be used including antenna systems, a front-end antenna module and other radio frequency subsystems. Always-on operation may provide for an information handling system to enter one or more sleep states but still be in communications, via an LPWAN radio system for example, with security and management solutions. These security or management solutions may function to protect or manage operations of the information handling system via remotely located services for example. Users may choose from among several available radiofrequency communication platforms in information handling systems for data and other communications with other data networks and remote services, including LPWAN communications during always-on operation for remote services such as for security and manageability. Always-on operation with radio systems that are always connected, including LPWAN, still may be a burden on battery life of information handling systems.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

DETAILED DESCRIPTION OF THE DRAWINGS

Figure 1:
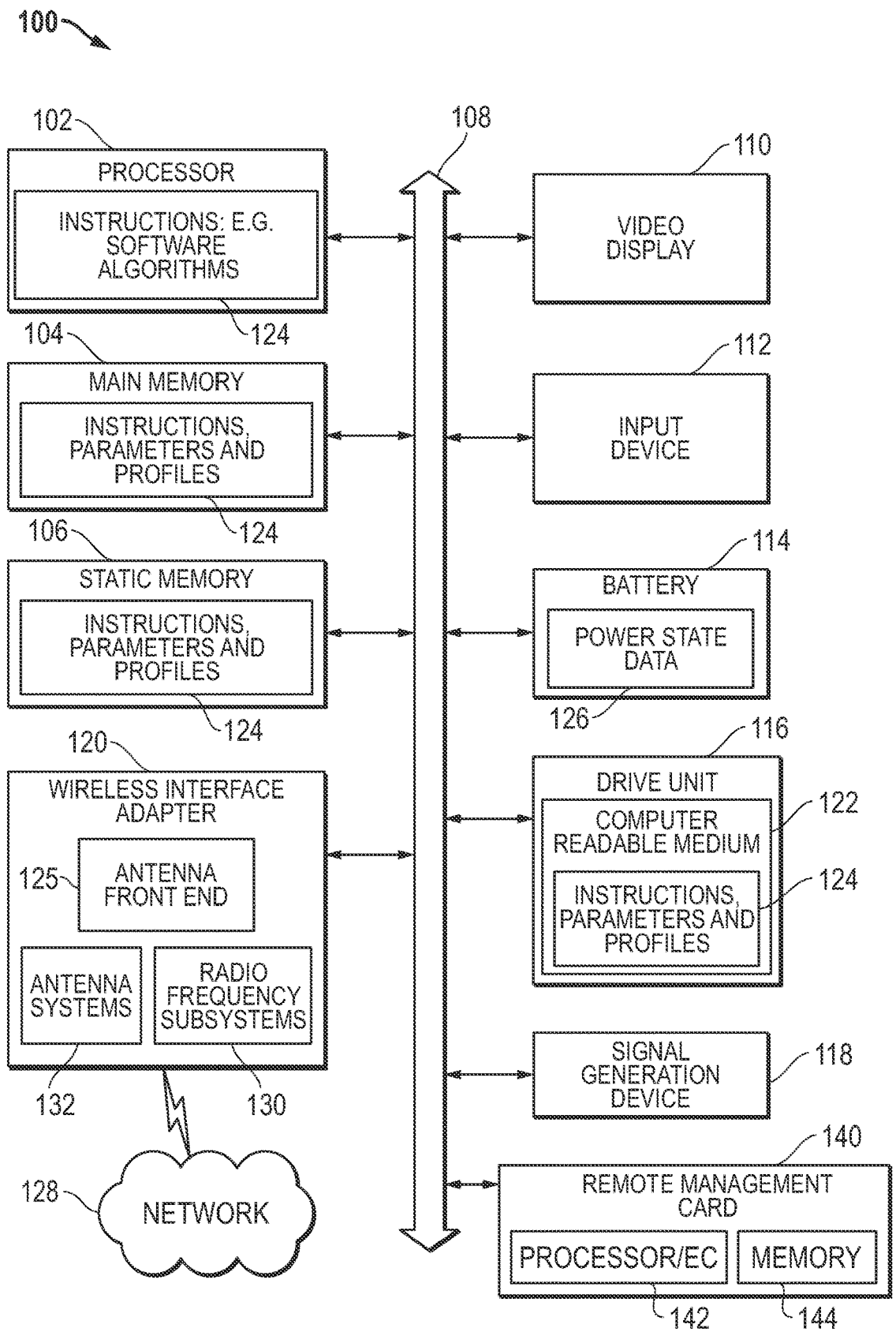
FIG. 1 is a block diagram illustrating an information handling system according to an embodiment of the present disclosure.

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system may be of a variety of models and types. For example, a personal computer may be a laptop, a 360 convertible computing device, a tablet, smart phone, wearable computing device, or other mobile information handling system and may have several configurations and orientation modes. The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. In an aspect, the information handling system may have a plurality of antenna systems for communication via wireless links operating on a variety of radio access technologies (RAT). In one aspect, a low power, always-on wireless link connectivity may be established even during powered-down sleep states of an information handling system, such as with low power communication technology protocols including low-power wireless local area network (LPWAN) technologies to provide some level of connectivity. In another aspect, several antenna systems may be available for each RAT to enable aggregated data communications such as via plural multiple in, multiple out (MIMO) streams to enhance bandwidth or reliability. Antenna systems may be operated via one or more wireless adapters that may include controllers, memory and other subsystems some of which may operate as a radio frequency (RF) front end for one or more antenna system to transmit wirelessly. In some aspects, the central processor and main operating systems may not need to be operating for wireless communications. Portions of an information handling system may themselves be considered information handling systems.

Always-on security and manageability solutions require information handling systems to be always connected, even during dormant or semi-dormant states such as sleep states. Such always-on security and manageability services and solutions provide for information technology (IT) management and control over individual information handling systems for many purposes including for security purposes. IT managers may utilize such services and solutions, for example, to manage and maintain multiple information handling systems within an organization. Managed information handling systems however may be utilized in many physical locations that may include some locations with wireless environments that are typically secure and may be trusted locations. Other locations may be more public locations whereby security is not as trustworthy. Some messages or information, such as security related messages, will require immediate attention by the in-band processing of the information handling system. The present disclosure describes an environment characteristics engine which may employ machine learning techniques to assess a plurality of factors to determine a location trust level for received indications of particular physical locations including from one or more wireless networks serving a particular physical location in various embodiments. For example, reports of higher incidences of attacks or security compromises detected at a location may affect the location trust level of a location or one or more wireless networks that serve a location in some embodiments. In other aspects, user behavior or security levels of data or access to secure data and systems by a monitored information handling system may also affect determination of a location trust level in some embodiments.

Always-on accessibility may be highly valued by IT managers, users, and other customers of such services. Considerations of battery life impacts of always-on connected radios must be considered. Despite the low power consumption of emerging technologies, such as LPWAN technologies, Narrow-band IoT, LTE Machine Type Communications (LTE-MTC, for example LTE Cat M1), LoRa, Sigfox, or similar protocols, penalization against battery life with enabled always-on radio connectivity should be minimized. One way of managing battery life impacts includes management of bringing up or waking up a central processor and operating system of an information handling system when incoming messages are received via the always-on low power communication technology, such as LPWAN, radio connection.

In an example embodiment of the present disclosure, waking up the operating system for in-band applications or by out-of-band applications may be limited to when only necessary based on location of the managed information handling system device. In an aspect, waking up the operating system may be based on detecting a location of the information handling system and the networks in that location. With the detected location and networks at such a location, an environment characteristics analysis engine may determine location trust level from a machine learning system algorithm determining security trustworthiness at various detected locations in some embodiments. By applying traffic management in an out-of-band environment, control over wake-up events for in-band applications or out-of-band applications may be realized to reduce overall system power consumption for when a managed information handling system or mobile device is operating at a location having a low trustworthiness history. A low power communications engine, sometimes referred to as an LP communications engine, is taught in the present disclosure that may direct incoming low power communication protocol data, such as LPWAN data traffic, based on location trust level determination by the environment characteristics analysis engine.

In other embodiments, a low power communication protocol data traffic limitation policy may be implemented by the low power communications engine when a battery level reaches a designated level such that the power conservation measures are applied under low battery power conditions. In such a way, the low power communications engine may determine what low power communication protocol data traffic limitations may be applied to avoid waking the operating system when in a trusted environment and when low battery power levels are indicated according to embodiments of the present disclosure.

In at least some embodiments of the present disclosure, traffic prioritization of messages received via low-power signals may occur based on determination of location trust levels. In some embodiments, if an information handling system is detected to be in an untrusted location, such as via determination that one or more wireless networks are unsecured or subject to a high frequency of attacks, the management or security solution data in the low power traffic flow may be passed to the in-band applications. This ensure that the management or security solution data sent in the low power traffic flow is addressed by in-band application upon a BIOS wake command to better protect the managed information handling system in the low trust level location. In other embodiments, the information handling system may be determined to be in a location that has a high trust level, such as within a secure facility with secured and encrypted wireless networks. In the latter situation, the need to wake the BIOS and in-band applications for the managed information handling system may be reduced since the risk of attack or compromise is reduced at such a secure location with secure wireless networks.

In other examples, other factors may determine what location trust levels are required. For example, user behavior or the nature of the managed information handling system including sensitivity of data or access to systems available via the managed information handling system may influence the level of trust determination for a location. A managed information handling system with high sensitivity data or access or with a user exhibiting risky activity may be more likely untrusted and a trigger sent to wake BIOS to receive incoming traffic from a low power communication protocol. In yet other embodiments, security or other high priority levels may be assigned to the incoming traffic from cloud agents of always-on management or security solutions. Those security levels may also be utilized to determine whether traffic flow is directed to in-band applications and to trigger a wake command to BIOS of the managed information handling system under circumstances of the detected location of the managed information handling system.

A low power communication engine may operate in the out-of-band environment to determine the location trust levels. The location trust levels may be determined in connection with indication of a location or the one or more networks accessible by a managed information handling system at a location. Additionally, the low power communication engine accesses an environment characteristics analysis engine which may access a trusted zones database with learned location security levels that are derived based on machine learning of past activity and event analysis with both the managed information handling system and the one or more networks available at a location. Further in some embodiments, learned location security levels may be established via crowd-sourced data regarding activity and events at available networks for a location. In an aspect, the crowd-sourced data may be used relating to information handling systems of a class type similar to the managed information handling system.

Other factors that may be used to determine the location trust levels include security status of one or more wireless networks at a location, sensitivity of data and access of the managed information handling system, user behavior using the managed information handling system. Many of these security factors as described may provide a plurality of variables for implementation with a machine learning system of an environment characteristics analysis engine as described herein to provide a classification of a location as trusted or untrusted pursuant to a location trust level score that may be generated. In other systems, the machine learning system may simply provide classification as trusted or untrusted in some embodiments depending on the types of machine learning algorithms used.

Additional factors may be implemented in other embodiments including utilizing any priority levels assigned to incoming low power data, battery or A/C power status of the managed information handling system and other factors. These various factors may be utilized by the environment characteristics analysis engine to apply policy to wake the BIOS of a managed information handling system depending on location trust levels and adjusted thresholds of the location trust levels to forward low power data streams. The wake policy may change dynamically depending on the factors relating to the security of the managed information handling system and the detected location and available networks there in some embodiments. Traffic not forwarded pursuant to a sufficiently high location trust level in some embodiments may be stored for later conveyance to the operating system and applications upon the information handling system being woken up by a user or for other reasons. In other embodiments, this low power traffic may be ignored or discarded.

FIG. 1 shows an information handling system 100 capable of administering each of the specific embodiments of the present disclosure. The information handling system 100 can represent the mobile information handling systems 210, 220, and 230 or servers or systems located anywhere within network 200 of FIG. 2, including the remote data centers operating virtual machine applications. Information handling system 100 may represent a managed information handling system associated with a user or recipient of intended wireless communication including communication under low power communication technology protocols. For example, a mobile information handling system may execute instructions via a processor for a low power communications engine in an out-of-band system environment including priority assessment of messages incoming on LPWAN wireless links or links of other low power communication technologies according to embodiments disclosed herein. The application programs communicating or otherwise may operate via one or more wireless links and may operate in some example embodiments as software, in whole or in part, on a mobile information handling system while other portions of the software applications may operate on remote server systems. The low power communications engine and environment characteristics analysis engine of the presently disclosed embodiments may operate as firmware, software, or hardwired circuitry or any combination on controllers or processors within the information handling system 100 or some of its components. For example, the low power communications engine of embodiments herein may operate via processor or control logic and memory on a remote management card 140 having a processor or embedded controller (EC) 142 and memory 144 and in connection with a wireless interface adapter 120 including an embedded controller or processor logic, or on some combination. Similarly, the environment characteristics engine may operate via the remote management card 140 with EC 142 and memory 144, or a wireless interface adapter 120 with embedded controller or processor logic and memory, or a combination of the same. Some or all of the remote management card 140 or a wireless interface adapter 120 or any portion of either may be integrated with a motherboard or may be separate boards within information handling system 100. In additional embodiments, portions of either or both the low power communications engine and environment characteristics analysis engine may operate on a managed information handling system or on remote server systems according to various embodiments. For example, access to a trusted zones database may be via remote connectivity such as through a low power communication technology wireless link in some embodiments.

Information handling system 100 may also represent a networked server or other system and administer aspects of the cloud agents of always-on management or security solutions via instructions executed on a processor according to various embodiments herein involving remote operation of such systems. Such cloud agents or remotely located always-on management or security solutions may transmit messages and data via the low-power, always-on radiofrequency signals from base station transmitters via low power communication technologies such as LPWAN.

The information handling system 100 may include a processor 102 such as a central processing unit (CPU), a graphics processing unit (GPU), or both. Moreover, the information handling system 100 can include a main memory 104 and a static memory 106 that can communicate with each other via a bus 108. As shown, the information handling system 100 may further include a video display unit 110, such as a liquid crystal display (LCD), an organic light emitting diode (OLED), a flat panel display, a solid state display, or a cathode ray tube (CRT). Display 110 may include a touch screen display module and touch screen controller (not shown) for receiving user inputs to the information handling system 100. Touch screen display module may detect touch or proximity to a display screen by detecting capacitance changes in the display screen as understood by those of skill. Additionally, the information handling system 100 may include an input device 112, such as a keyboard, and a cursor control device, such as a mouse or touchpad or similar peripheral input device. The information handling system may include a power source such as battery 114 or an A/C power source. The information handling system 100 can also include a disk drive unit 116, and a signal generation device 118, such as a speaker or remote control. The information handling system 100 can include a network interface device such as a wireless adapter 120. The information handling system 100 can also represent a server device whose resources can be shared by multiple client devices, or it can represent an individual client device, such as a desktop personal computer, a laptop computer, a tablet computer, a 360 degree convertible device, a wearable computing device, or a mobile smart phone.

The information handling system 100 can include a set of instructions 124 that can be executed to cause the computer system to perform any one or more of the methods or computer based functions disclosed herein. For example, instructions 124 may include operating systems or in-band software applications which utilize one or more wireless links for wireless communications via the wireless interface adapter or receive messaging via low power wireless connections. Such instructions 124 may operate other aspects or components of an information handling system. Similarly, instructions 124 may be executed as part of in-band operations responsive to low power communications for always-on management or security solutions that may receive messages and requiring activity or responses. In some aspects, incoming low power messages may have varying levels of priority attached and be received via monitored low power wireless links in various embodiments. The low power communications engine operating within an out-of-band environment in some embodiments may utilize processing resources of a remote management card 140 or of a low power wireless interface adapter 120. The low power communications engine may operate as firmware on a controller or software on a processor within the remote management card 140, the wireless interface adapter device 120, or some combination and utilize low power wireless connectivity for communications. The low power communications engine receives low power wireless data communications from network 128, such as through various low power communication technology protocols such as LPWAN. Low power wireless data communications may be received via the low power antenna system 132 and antenna front end 125 as described in the present disclosure. The firmware or software of the low power communications engine operating on a controller or processor may determine location of an information handling system via a low power wireless link or may detected location via a global navigation satellite system (GNSS) such as global positioning system (GPS) or other systems. Further, identification of active or available wireless networks at a location may also be determined for the managed information handling system. Other data may include power status from power state data and message priority levels from received LPWAN data packets. The low power communications engine implements a policy for waking information handling system 100 to pass messaging to in-band applications such as instructions 124 operating via processor 102 and memory 104 or by passing low power communication technology protocol messaging to out-of-band applications that may wake processor 102 of information handling system 100 to handle commands or requests according to determined location trust levels as needed.

Wireless interface device 120 may include an embedded processor, controller, or access to other processing not requiring the entire CPU 102 and information handling system to wake up to a high-power, high operation state in some embodiments of a low power wireless technology protocol connected system. The wireless interface device 120 may include radiofrequency subsystems 130 including controllers, a processor, or other logic to implement operation of a low power communications engine according to some embodiments herein. In other embodiments, controllers, a processor, or other logic may be accessed for operation in an out-of-band operation environment for operations of the low power communications engine such as on remote management card 140 having processor or embedded controller 142. Further, the wireless interface device 120 or remote management card 140 may have or may access a memory for storing received low power messages not deemed for elevation to internal applications upon receipt until the BIOS of an information handling system 100 otherwise wakes up according to some embodiments. Such a system may provide for out-of-band operation for background or limited operation to enable the information handling system 100 to be always-connected, such as via a LPWAN wireless protocol, and to conduct some communications and processing while in a sleep state or under low power state conditions.

In an example embodiment, out-of-band operation for management or security may be conducted with systems such as Dell® Command/Intel vPro Out-of-band or Dell Management Engine out-of-band operation for information handling systems. Such a system may provide for out-of-band management by IT professionals to remotely manage client systems regardless of power state of those client systems. Such as a Dell Command/Intel vPro Out-of-band system or a Dell Management Engine out-of-band system may operate for indications for client selection, monitoring of client systems, and diagnosis of client systems as well as managing client configurations for power profiles, boot order, BIOS settings and passwords and the like. Additional operations and provisioning as well as health and operation monitoring may be conducted. In other example embodiments, remote management may be conducted by enterprise mobility management system such as VMWare's AirWatch®. Airwatch may operate on a managed information handling system as an in-band application in some embodiments. Management of multiple devices within an organization for security or operation management may be conducted via a single management console and some types of communications may be conducted through low power wireless communications messaging for various low power wireless communications technologies such as through LPWAN. Airwatch may alert managed information handling systems to wake up and implement in-band AirWatch application operations in some embodiments. According to various embodiments herein, a low power communications engine may assess incoming messages on low power wireless links, such as LPWAN links, and determine priority levels assigned to those messages. Priority levels are assigned to those data packets comprising messages by the sending always-on management or security solutions, such as those listed above, and used in determining to wake up a receiving information handling system 100 by passing the messages for further processing. Further, the always-on management or security solutions, such as Dell Command/Intel vPro Out-of-band, Dell Management Engine out-of-band system, or AirWatch solutions, may also operate on information handling systems 100 for remote connectivity to the receiving information handling systems in other embodiments. For example, the always-on management or security solutions may operate via one or more cloud agent devices to provide low power communications for management, monitoring, provisioning, updating, security and other tasks desired to occur by IT management of enterprise mobility management, server system management, or the like within organizations deploying multiple, networked information handling systems.

Various software modules comprising software application instructions 124 or firmware instructions may be coordinated by an operating system (OS) and via an application programming interface (API). An example operating system may include Windows®, Android®, and other OS types known in the art. Example APIs may include Windows API/Win 32, Core Java API, or Android APIs. In a further example, processor 102 may conduct monitoring and processing of information handling system usage trends, provisioning, updates, security applications according to the systems and methods disclosed herein. The computer system 100 may operate as a standalone device or may be connected such as using a network, to other computer systems or peripheral devices. For example, a cloud client information handling system may provide for always-on management or security solutions to managed information handling systems in low-power states as well as when the managed information handling systems are fully awake and operating via an active processor 102 and the main operating system.

In a networked deployment, the information handling system 100 may operate in the capacity of a server or as a client user computer in a server-client user network environment, or as a peer computer system in a peer-to-peer (or distributed) network environment. The information handling system 100 can also be implemented as or incorporated into various devices, such as a personal computer (PC), a tablet PC, a set-top box (STB), a PDA, a mobile information handling system, a tablet computer, a laptop computer, a desktop computer, a communications device, a wireless smart phone, wearable computing devices, a land-line telephone, a control system, a camera, a scanner, a facsimile machine, a printer, a pager, a personal trusted device, a web appliance, a network router, switch or bridge, a server, an access point, or any other machine capable of executing a set of instructions (sequential or otherwise) that specify actions to be taken by that machine. In a particular embodiment, the computer system 100 can be implemented using electronic devices that provide voice, video or data communication. Further, while a single information handling system 100 is illustrated, the term "system" shall also be taken to include any collection of systems or sub-systems that individually or jointly execute a set, or multiple sets, of instructions to perform one or more computer functions.

The disk drive unit 116 may include a computer-readable medium 122 in which one or more sets of instructions 124 such as software can be embedded. Similarly, main memory 104 and static memory 106 may also contain computer-readable medium for storage of one or more sets of instructions, parameters, or profiles 124. The disk drive unit 116 and static memory 106 also contains space for data storage. Further, the instructions 124 may embody one or more of the methods or logic as described herein.

In a particular embodiment, the instructions, parameters, and profiles 124 may reside completely, or at least partially, within the main memory 104, the static memory 106, and/or within the disk drive 116 during execution by the processor 102 of information handling system 100. As explained, some or all of the low power communications engine or the always-on management or security solutions may be executed locally or remotely. The main memory 104 and the processor 102 also may include computer-readable media. Battery 114 may include a smart battery system that tracks and provides power state data 126. This power state data may be stored with the instructions, parameters, and profiles 124 to be used with the systems and methods disclosed herein. For example, a power management subsystem or unit may monitor and determine power connection or battery levels for utilization by the low power communications engine in some embodiments.

A network interface device shown as wireless adapter 120 can also provide connectivity to a network 128 not only for low power communication technology protocols such as LPWAN as described, but also via other wireless protocols that may be deployed with the information handling system. For example, a wide area network (WAN), a local area network (LAN), wireless local area network (WLAN), a wireless personal area network (WPAN), a wireless wide area network (WWAN), or other network may be implemented with a wireless adapter such as 120. Connectivity may be via wired or wireless connection. Wireless adapter 120 may include one or more radio frequency subsystems 130 with transmitter/receiver circuitry, modem circuitry, one or more unified radio frequency front end circuits, one or more wireless controller circuits, amplifiers, antenna systems 132 and other radio frequency subsystem circuitry 130 for wireless communications via multiple radio access technologies. In other embodiments a plurality of wireless adapters 120 may be deployed with the information handling system. Each radiofrequency subsystem 130 may communicate with one or more wireless technology protocols. The radiofrequency subsystem 130 may contain individual subscriber identity module (SIM) profiles for each technology service provider and their available protocols for subscriber based radio access technologies such as cellular LTE communications. The wireless adapter 120 may also include antenna systems 132 some of which may be tunable antenna systems for use with the system and methods disclosed herein.

In some aspects of the present disclosure, one wireless adapter 120 may operate two or more wireless links. In a further aspect, the wireless adapter 120 may operate the two or more wireless links with a single, shared communication frequency band such as with the 5G standard relating to unlicensed wireless spectrum for small cell 5G operation or for unlicensed Wi-Fi WLAN operation in an example aspect. For example, a 5 GHz wireless communication frequency band may be apportioned under the 5G standards for communication on either small cell WWAN wireless link operation or Wi-Fi WLAN operation. In some embodiments, the shared, wireless communication band may be transmitted through one or a plurality of antennas. Other shared communication frequency bands are contemplated for use with the embodiments of the present disclosure as well.

The wireless adapter 120 may operate in accordance with any wireless data communication standards. To communicate in low power communication technology standards, standards including LPWAN, Narrow Band IoT and LTE Category Machine (e.g., Cat M1) standards promulgated by 3GPP Narrowband cellular or later iterations, LoRa standard, Sigfox, and other low power standards may be utilized. For example, Narrow Band IoT may operate at 200 kHz and LTE Cat M1 band may operate in a range from 1.4 to 20 MHz. To communicate with a wireless local area network, standards including IEEE 802.11 WLAN standards, IEEE 802.15 WPAN standards, WWAN such as 3GPP or 3GPP2, or similar wireless standards may be used. Wireless adapter 120 may connect to any combination of macro-cellular wireless connections including 2G, 2.5G, 3G, 4G, 5G or the like from one or more service providers. Utilization of radiofrequency communication bands according to several example embodiments of the present disclosure may include bands used with LPWAN standards, the WLAN standards, and WWAN carriers which may operate in both license and unlicensed spectrums. For example, both WLAN and WWAN may use the Unlicensed National Information Infrastructure (U-NII) band which typically operates in the ~5 MHz frequency band such as 802.11 a/h/j/n/ac (e.g., center frequencies between 5.170-5.785 GHz). It is understood that any number of available channels may be available under the 5 GHz shared communication frequency band. WLAN, for example, may also operate at a 2.4 GHz band. WWAN may operate in a number of bands, some of which are propriety but may include a wireless communication frequency band at approximately 2.5 GHz band for example. In additional examples, WWAN carrier licensed bands may operate at frequency bands of approximately 700 MHz, 800 MHz, 1900 MHz, or 1700/2100 MHz for example as well. In the example embodiment, mobile information handling system 100 includes both unlicensed wireless radio frequency communication capabilities as well as licensed wireless radio frequency communication capabilities. For example, licensed wireless radio frequency communication capabilities may be available via a subscriber carrier wireless service. With the licensed wireless radio frequency communication capability, WWAN RF front end may operate on a licensed WWAN wireless radio with authorization for subscriber access to a wireless service provider on a carrier licensed frequency band.

The wireless adapter 120 can represent an add-in card, wireless network interface module that is integrated with a main board of the information handling system or integrated with another wireless network interface capability, or any combination thereof. In an embodiment the wireless adapter 120 may include one or more radio frequency subsystems 130 including transmitters and wireless controllers for connecting via a multitude of wireless links. In an example embodiment, an information handling system may have an antenna system transmitter 132 for low power communication technology protocols such as LPWAN, 5G small cell WWAN, Wi-Fi WLAN or WiGig connectivity and one or more additional antenna system transmitters 132 for other wireless communication types. The radio frequency subsystems 130 include wireless controllers to manage authentication, connectivity, communications, power levels for transmission, buffering, error correction, baseband processing, and other functions of the wireless adapter 120.

The radio frequency subsystems 130 of the wireless adapters may also measure various metrics relating to wireless communication in the present disclosure. For example, the wireless controller of a radio frequency subsystem 130 may manage detecting and measuring received signal strength levels, bit error rates, signal to noise ratios, latencies, jitter, and other metrics relating to signal quality and strength. In one embodiment, a wireless controller of a wireless interface adapter 120 may manage one or more radio frequency subsystems 130. The wireless controller also manages transmission power levels which directly affect radio frequency subsystem power consumption as well as transmission power levels from the plurality of antenna systems 132.

The wireless network may have a wireless mesh architecture in accordance with mesh networks described by the wireless data communications standards or similar standards in some embodiments but not necessarily in all embodiments. The wireless adapter 120 may also connect to the external network via an LPWAN, WPAN, WLAN, WWAN or similar wireless switched connection. The wireless data communication standards set forth protocols for communications and routing via access points, as well as protocols for a variety of other operations. Other operations may include handoff of client devices moving between nodes, self-organizing of routing operations, or self-healing architectures in case of interruption.

In some embodiments, software, firmware, dedicated hardware implementations such as application specific integrated circuits, programmable logic arrays and other hardware devices can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by firmware or software programs executable by a controller or a processor system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions, parameters, and profiles 124 or receives and executes instructions, parameters, and profiles 124 responsive to a propagated signal; so that a device connected to a network 128 can communicate voice, video or data over the network 128. Further, the instructions 124 may be transmitted or received over the network 128 via the network interface device or wireless adapter 120.

Information handling system 100 includes one or more application programs 124, and Basic Input/Output System and firmware (BIOS/FW) code 124. BIOS/FW code 124 functions to initialize information handling system 100 on power up, to launch an operating system, and to manage input and output interactions between the operating system and the other elements of information handling system 100. Moreover, BIOS/FW code may manage and respond to wake up commands from various advanced configuration and power interface (ACPI) states via ACPI-aware BIOS and controls via ACPI tables, BIOS, and registers. In some embodiments, the low power communications engine operating via a remote management card 140 may issue a wake up command to BIOS upon triggering according to embodiments herein. Such ACPI operation may control global states, processor states, device states for various types of sleep states as well as performance states such as CPU or GPU throttling and the like. This may include Active State Power Management (A SPM) as well as other power management measures in the information handling system 100. In a particular embodiment, BIOS/FW code may reside in memory 104, and include machine-executable code that is executed by processor 102 to perform various functions of information handling system 100. In another embodiment (not illustrated), application programs and BIOS/FW code reside in another storage medium of information handling system 100. For example, application programs and BIOS/FW code can reside in drive 116, in a ROM (not illustrated) associated with information handling system 100, in an option-ROM (not illustrated) associated with various devices of information handling system 100, in storage system 107, in a storage system (not illustrated) associated with network channel of a wireless adapter 120, in another storage medium of information handling system 100, or a combination thereof. Application programs and BIOS/FW code such as code instructions 124 can each be implemented as single programs, or as separate programs carrying out the various features as described herein.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as solid state memory, disks, tapes, or other storage device to store information received via carrier wave signals such as a signal communicated over a transmission medium. Furthermore, a computer readable medium can store information received from distributed network resources such as from a cloud-based environment. For example, a digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Figure 2:
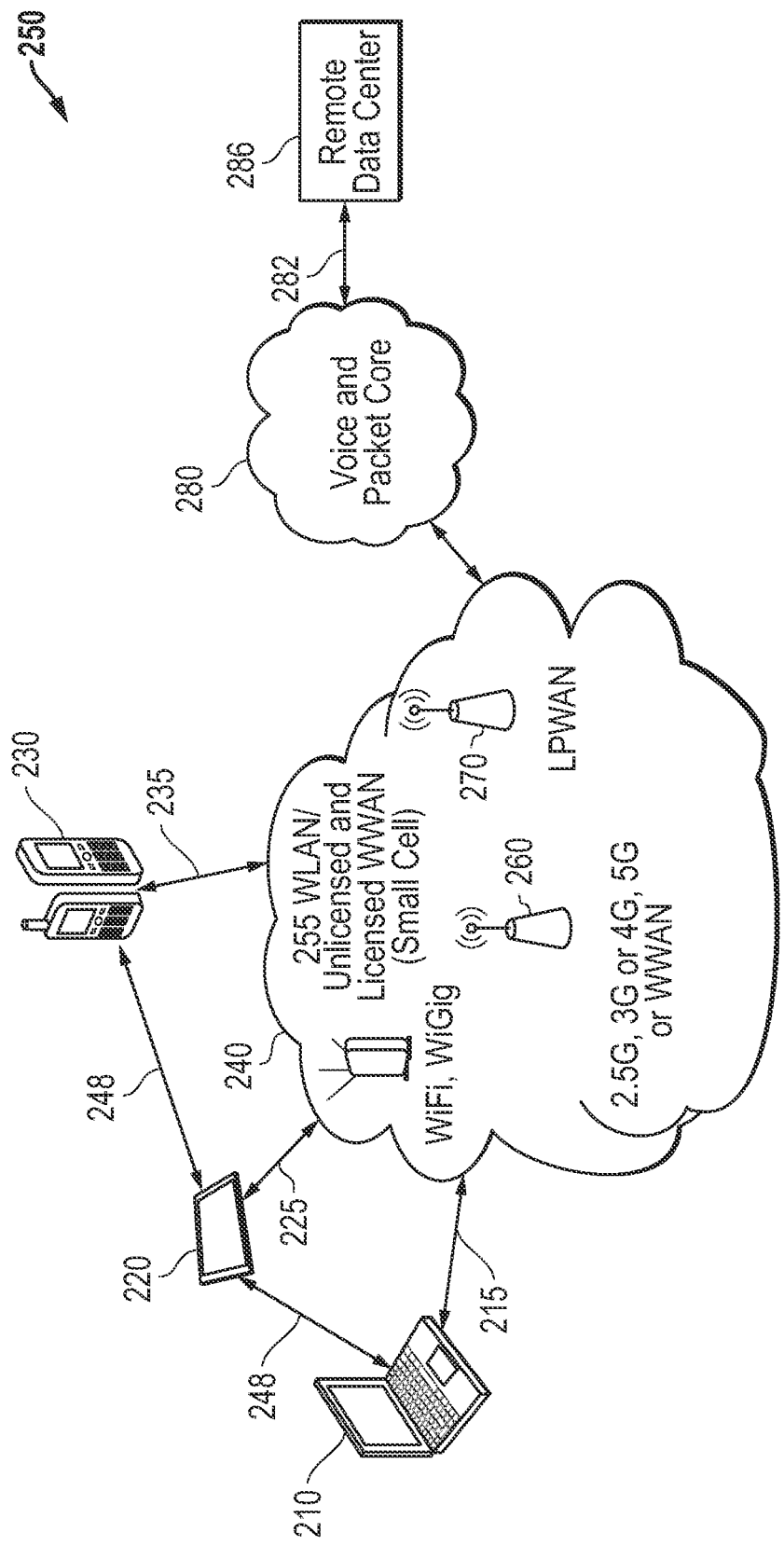
FIG. 2 is a block diagram of a network environment offering several communication protocol options and mobile information handling systems according to an embodiment of the present disclosure.

FIG. 2 illustrates a network 250 that can include one or more information handling systems. In a particular embodiment, network 250 includes networked information handling systems 210, 220, and 230 with wireless capabilities, wireless network access points such as 255, 260, 270, and multiple wireless connection link options. A variety of additional computing resources of network 250 may include client mobile information handling systems, data processing servers, network storage devices, local and wide area networks, or other resources as needed or desired. As specifically depicted, systems 210, 220, and 230 may be a laptop computer, tablet computer, 360 degree convertible systems, wearable computing devices, a smart phone device, server systems, or other computing systems. These mobile information handling systems 210, 220, and 230, may access any of a plurality of wireless networks 240. In an example embodiment, information handling systems 210, 220, or 230 may be managed information handling systems utilizing the systems and methods disclosed in embodiments herein. Wireless networks 240 may include low power communication technologies such as LPWAN 270, a macro-cellular network 260, or wireless local networks such as 255 including Wi-Fi, WiGig, other WLAN, and small cell WWAN. For example, the wireless networks 240 may be the LPWAN network 270 or other low power communication technologies described in embodiments herein for low-power, always-on wireless communication in some embodiments. In other embodiments, wireless networks may include wireless local area networks (WLANs) or small cell systems 255, a wireless personal area network (WPAN) 248 as between devices such as 210, 220, and 230, or a wireless wide area network (WWAN) such as 260. In an example embodiment, LTE LPWAN networks may operate with a wireless access point option such as an eNodeB (eNB) base station or other LPWAN base station device. In another example embodiment, LTE-LAA WWAN may operate with a small-cell WWAN wireless access point option.

Since WPAN or Wi-Fi Direct Connection 248 and WWAN networks can functionally operate similar to WLANs, they may be considered as wireless local area networks (WLANs) for purposes herein. Components of a WLAN, an LPWAN, or other low power communication technologies may be connected by wireline or Ethernet connections to a wider external network. For example, wireless network access points may be connected to a wireless network controller and an Ethernet switch.

Wireless communications across any of wireless networks 240 may be via standard protocols such as Narrow-band IoT LPWAN, LTE Category Machine LPWAN standards (such as Cat M1), LoRa, Sigfox, other low power communication technologies, IEEE 802.11 Wi-Fi, IEEE 802.11ad WiGig, IEEE 802.15 WPAN, or other emerging 5G small cell WWAN communications such as eNodeB, or similar wireless network protocols. Alternatively, other available wireless links within wireless networks 240 of network 250 may include macro-cellular connections via one or more service providers 260. Service provider macro-cellular connections may include 2G standards such as GSM, 2.5G standards such as GSM EDGE and GPRS, 3G standards such as W-CDMA/UMTS and CDMA 2000, 4G standards, or emerging 5G standards including WiMAX, LTE, and LTE Advanced, LTE-LAA, small cell WWAN, and the like. Wireless networks 240 may include a variety of licensed, unlicensed or shared communication frequency bands as well as a variety of wireless protocol technologies ranging from those operating in macrocells, small cells, picocells, or femtocells.

In some embodiments according to the present disclosure, a networked information handling system 210, 220, or 230 may have a plurality wireless network interface systems capable of transmitting simultaneously within a shared communication frequency band. That communication within a shared communication frequency band may be sourced from different protocols on parallel wireless network interface systems or from a single wireless network interface system capable of transmitting and receiving from multiple protocols. Similarly, a single antenna or plural antennas may be used on each of the wireless communication devices. Example protocols for use with low power communication technologies may be low-power wireless network access protocols such as LTE Narrowband IoT, LTE Category Machine protocols, LoRa protocols, Sigfox protocols, or other LPWAN protocols enabling device to device communications along with connectivity to wider network resources via ethernet or other wired connections. With low power communication technology wireless links, information handling systems such as 210, 220, and 230 may remain connected for always-on communication to support always-on management or security solutions for IT managers to manage aspects of those information handling systems despite sleep state that may currently be implemented. The always-on communication may occur and may be received and executed upon, but depending on several factors including trusted level of location and available networks at a location, security posture of the managed information handling system or user behavior, any priority rating of incoming low power data traffic, power state of the managed information handling system, and other factors according to embodiments herein. Such sending a wake command to BIOS to power on an information handling system from a sleep state consumes power and may not be necessary when in secure locations according to some embodiments. Nonetheless, the low power communications engine utilizing a low power communication technology wireless protocol, for example LPWAN, may continue to maintain always-on connectivity via a low power wireless interface adapter and remote management card according to embodiments herein.

Wireless networks 240 may be connected through to a voice and packet core network 280 may contain externally accessible computing resources and connect to a remote data center 286 in network 250. The voice and packet core network 280 may contain multiple intermediate web servers or other locations with accessible data (not shown). The voice and packet core network 280 may also connect to other wireless networks similar to those shown within 240 and additional mobile information handling systems such as 210, 220, 230 or similar connected to those additional wireless networks. Connection 282 between the wireless networks 240 and remote data center 286 or connection to other additional wireless networks may be via Ethernet or another similar connection to the world-wide-web, a WAN, a LAN, another WLAN, or other network structure. Such a connection 282 may be made via a WLAN access point/Ethernet switch to the external network and be a backhaul connection. The access point may be connected to one or more wireless access points in the WLAN before connecting directly to a mobile information handling system or may connect directly to one or more information handling systems 210, 220, and 230. Alternatively, information handling systems 210, 220, and 230 may connect to the external network via base stations according to various wireless protocols 255, 260, or 270 within wireless networks 240. The remote data centers or other remote information handling systems may provide central terminals for IT management and security assessment via operation of always-on management or security solution code instructions via cloud agents of such systems in various embodiments.

Remote data centers may include web servers or resources within a cloud environment that operate via the voice and packet core 280 or other internet connectivity. For example, remote data centers can include additional information handling systems, data processing servers, network storage devices, local and wide area networks, or other resources as needed or desired. Having such remote capabilities may permit powerful resources to be maintained for low-power access during any sleep state or wake state of the information handling systems 210, 220, and 230 and allowing streamlining and efficiency of power consumption while providing effective management within those devices by the always-on management or security solutions. Similarly, a remote data center permits fewer resources to be maintained in other parts of network 250.

In an example embodiment, the cloud or remote data center or networked server may run hosted applications for systems 210, 220, and 230 such as the always-on management or security solution code instructions. For example, remote data center, networked server, or some combination of both may operate some or all of a Dell Command/Intel vPro®, Dell Management Engine®, or Airwatch® in various example embodiments including providing low-power, always-on communication access for messages and commands depending upon trust levels at the location and networks where the managed information handling system has been detected. For example, security alerts, setting adjustments, provisioning for managed information handling systems 100 or updates of the same as disclosed in the present disclosure may be transmitted via the low power communication technology (e.g., LPWAN) system even during sleep states. Assessment of learned trust levels for location and networks accessible at the determined location may be utilized to determine if low power data streams supporting management or security services should be passed to in-band applications and the managed information handling system woken up.

The cloud or remote data center or networked server may run hosted applications for systems 210, 220, and 230 by establishing a virtual machine application executing software to manage applications hosted at the remote data center in an example embodiment. Information handling systems 210, 220, and 230 may adapted to run one or more applications locally, and to have hosted applications run in association with the local applications at remote data center or networked servers. For example, mobile information handling systems 210, 220, and 230 may operate some or all in-band software applications utilizing the wireless links, including a concurrent wireless links, of any of the wireless links 215, 225, 235 in some embodiments. Virtual machine applications may serve one or more applications to each of information handling system 210, 220, and 230. Thus, as illustrated, systems 210, 220, and 230 may be running applications locally while requesting data objects related to those applications from the remote data center via wireless network 240 when the information handling systems are awake and operating in various operating states. For example, an electronic mail client application may run locally at system 210. The electronic mail client application may be associated with a host application that represents an electronic mail server. In another example, a data storage client application such as Microsoft Sharepoint may run on system 220. It may be associated with a host application running at a remote data center that represents a Sharepoint data storage server. In a further example, a web browser application may be operating at system 230. Similar arrangements may be made for management or security services provided from remote location such as Dell Command/Intel vPro®, Dell Management Engine®, or Airwatch®. The web browser application may request web data from a host application that represents a hosted website and associated applications running at a remote data center.

Figure 3:
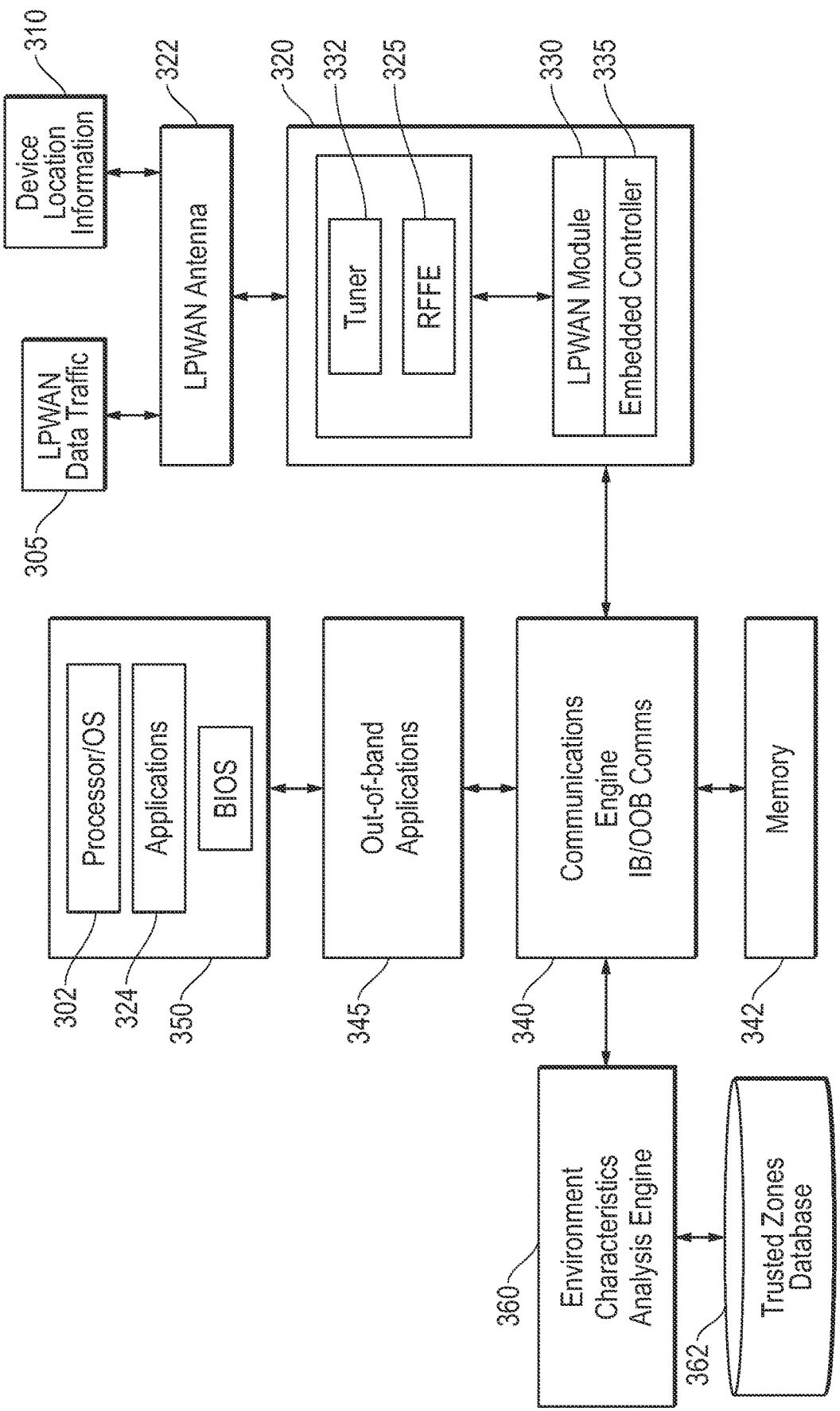
FIG. 3 block diagram illustrating an LPWAN wireless interface adapter with a low power (LP) communications engine and location trust analysis for an information handling system according to an embodiment of the present disclosure.

FIG. 3 illustrates a wireless interface adapter 320 including RF front end 325 and tuner 332 for one or more antenna systems, such as a low power communication technology antenna (for example LPWAN) 322, that may operate on an information handling system in an example embodiment. Wireless interface adapter 320 may receive low power communications data traffic 305 via a low power communications technology protocol antenna 322. In some embodiments, device location information 310 and access to data from remotely located portions of the environment characteristics engine 360 and trusted zones database 362 may be accessed or received via the low power wireless interface adapter 320 and low power antenna systems 322. In some embodiments, GNSS location services may be available in the out-of-band environment.

In one aspect, the wireless interface adapter 320 may be utilized with an out-of-band operational environment in that it may be implementable in a variety of models of information handling systems to provide for always-on wireless connectivity in a variety of sleep states or performance states. The out-of-band operational environment may include an embedded processor, such as embedded controller 335, that may provide logic for firmware or software instructions that implement a low power communications engine 340 and an environment characteristics engine 360 according to embodiments of the present disclosure. In other embodiments, the low power communications engine 340 and an environment characteristics engine 360 may be implemented on processing or logic available from elsewhere in a managed information handling system, such as a remote management card in some embodiments. A processor or controller available in an out-of-band environment may operate even during sleep states or lowered performance states under the ACPI or other power saving protocols.

The low power communication technology wireless interface adapter 320 may include the RF front end 325, tuners 332, an RF front end controller such as 335 and may include access to a local memory 342 in some embodiments. Additional memory capacity may include a larger memory or a separate memory to house a trusted zones database 362 for use with some embodiments of the present disclosure. In other embodiments, the communications engine 340 and the environment characteristics analysis engine 360 may access a trusted zones database 362 which may be in part located at remote site and accessible through the low power communication technology data link. The embedded controller 335 may also interface with the one or more tuners 332 and execute the low power communication technology module 330 for conducting low power communication technology communications according to protocols being implemented for the low power communication technology communications. For example, low power communication technology protocols such as LPWAN, LoRa, Sigfox, LTE Narrowband IoT and LTE Category Machine protocol types and others may be implemented in some embodiments as understood in the art with the low power communication technology module 330. The RF front end module 325 may interface with one or more low power communication technology antenna systems 322 directly or via a tuner system 332.

Components of the low power communication technology wireless interface adapter such as LPWAN adapter 320 may be connected internally and to a plurality of system motherboard components for an information handling system. For example, I2C lines may be connected between the RF front end 325 and a low power communication technology module. Additional communication lines may operatively connect the components of the low power communication technology wireless interface adapter 320 to the motherboard 350 or remote management card of an information handling system. The remote management card may operate code instructions of a low power communications engine 340 for handling both in-band (IB) bound and out-of-band (OOB) bound communications. The low power communications engine may also have a processor or controller on the remote management card to operate out-of-band applications 345 in various embodiments. The remote management card in some embodiments may further have access to a local memory such as 342 in some embodiments. In a further aspect, a Mobile Industry Processor Interface (MIPI) lines may be connected among components of the low power communication technology wireless interface adapter 320 or the motherboard 350 and remote management card operating the low power communications engine of the information handling system in other embodiments. The MIPI connector or I2C may be connected to the low power communication technology module 330 to forward instructions, policy details, or other data or commands to the RF front end 325 according to embodiments of the present disclosure. It is understood that the I2C lines or MIPI lines may be used for various aspects of the embodiments disclosed herein including for transfer of data, policy, or commands from the protocol module 330 or other subsystems of the wireless interface device adapter 320. Further, other bus systems as shown in FIG. 1 may be used for communications between the low power communication technology interface adapter 320 and portions of the motherboard of the managed information handling system.

Low power communications engine 340 of the present disclosure may include hardware, firmware, or software instructions to determine location via incoming messages indicating location and available wireless networks from low power wireless links or via GNSS location indications. The low power communications engine 340 further determines location trust levels via an environment characteristics analysis engine 360 which may assess multiple security factors learned for a detected location, operational behavior of a user, and security posture of the managed information handling system as described in embodiments herein. The environment characteristics analysis engine 360 may access derived trust levels or trust classifications for detected locations, if available, from a trusted zones database in memory 362. The trusted zones database in memory 362 may located locally to the out-of-band system of a network management card as shown or may be located remotely and accessible via low-power wireless links or may be some combination. For example, a local trusted zones database of memory 362 may be updated from a wider remotely located database in some embodiments. Determination of location trust levels or trust classifications for a plurality of locations and available networks may be used to determine whether to pass inbound messages to in-band applications 324 operating via processors such as 302 or to remain with out-of-band applications 345 or for storage in the out-of-band environment upon detection of a managed information handling system location. Storage of inbound messages may be made in memory local to the communications engine 340 on a network management card such as memory 342 or 362, or on a memory of a wireless interface adapter 320, or in other memory of the managed information handling system network designated for such a purpose.

With incoming low power communication technology data traffic, the low power communications engine 340 and environment characteristics analysis engine 360 may determine a location trust level for a managed information handling system at a detected location. With the location trust level, a trust classification for the location may be determined. An untrusted classification identifies when to trigger a wake event with the BIOS for the managed information handling system and pass low power communication technology data traffic to in-band applications immediately. For managed information handling systems determined to be in a trusted location, incoming low power communication technology traffic may not be immediately forwarded and no BIOS wake event triggered. In the above embodiment, the incoming low power communication technology data traffic may be stored in some embodiments for later forwarding, or ignored or discarded in other embodiments of the present disclosure.

The low-power communications engine 340 operates in an out-of-band environment in whole or in part on a processor or controller other than the CPU 302. In an example embodiment, the out-of-band environment may operate on embedded controller 335 or on other processors or controllers such as for a remote management card that may establish the communication engine 340 and link to wireless interface adapter 320. In further embodiments, out-of-band environment may reside in some portion of processing on the motherboard 350, such as with an integrated remote management card. The low power communications engine 340 may interface with the BIOS operating with the operating system of the main processor or processors in various embodiments when wake up is needed. An event may cause the low power communications engine to send a trigger from an embedded controller on a network management card or elsewhere to wake the BIOS in some example embodiments. Additionally, the low power communication technology interface adapter 320 may operate during powered-down sleep states such that an embedded controller 335 may serve as a network interface controller in some aspects. Embedded controller 335, a remote management card, or some combination may implement Remote Management Control Protocol (RMCP) or similar remote management protocol via a separate MAC address from other wireless communications to provide communications, data, instructions or the like received via a remote management card which may be separate or integrated into motherboard 350.

In some embodiments, the remote management card may include a processor or controller (not shown) to execute code instructions in software or firmware in the out-of-band environment. Often the out-of-band environment may include remote management and some out-of-band applications 345 that may influence operations such as remote reboot, provisioning and others as described above. This out-of-band environment may be provided with always-on management or security solutions such as Dell Command/Intel vPro Out-of-band or Dell Management Engine for example. Nonetheless, processing capability of the remote management card, whether integrated or not, may provide for execution of instructions of the low power communications engine 340 in assessing both out-of-band communications and in-band communications. This may be done in some embodiments via the processor or controller on the remote management card or in combination with a processor or controller in the wireless interface adapter 320. In some embodiments, the remote management card may include memory 342 which may be used to execute out-of-band applications 345 as well as activity of the low power communications engine 340 such as to store communications or data.

As described in greater detail in embodiments herein, always-on management or security solutions, such as Dell Command/Intel vPro Out-of-band, Dell Management Engine, or AirWatch In-band Applications, may operate to send messages, commands, data or the like via low-power communications on a low power communication technology wireless link to a managed information handling system. The low power communication technology wireless interface adapter 320 may receive the low-power technology protocol communications. The low-power communications engine 340 and the environment characteristics analysis engine 360 assess location trust levels and trust classification for a detected location and networks to determine whether to forward those messages designated for in-band applications to the operating system and to trigger a BIOS wake event. According to additional embodiments herein, a header priority designation may also be assessed to determine if the incoming low power wireless connection data stream is crucial enough to warrant triggering a wake event. Moreover, in some other embodiments, a battery power level assessment or A/C power connection status is made to determine if a wake event will not be problematic to forward inbound low power messages to in-band applications.

Depending on a received or detected location and wireless networks accessible at the detected location, the trusted zones database 362 may have a variety of location history data recorded. Location history data may include data relating to security events, network security statuses, encryption or other protection available on the accessible networks or managed information handling system, user behavior and other factors assessed by a machine learning analysis of a location trust level or location trust classification. Factors such as user behavior or security posture of a managed information handling system may also be used to adjust the location trust level or trust classification threshold in the environment characteristics analysis. These and other factors may be dynamically altered with changes to the location or managed information handling system operation. For example, changes to users logged on or changes to accessibility rights or sensitivity of stored data on the managed information handling system in some embodiments may continuously change for a managed information handling system or accessible wireless networks at a location. In other aspects, the trusted zones database 362 may include a location trust level score or trust classification for a plurality of locations or networks visited by managed information handling system. The location trust level scores or trust classifications may be determined remotely via a machine learning portion of the environment characteristics analysis engine and updated locally at memory 362 in some embodiments.

Additional considerations may include assessment of priority designations of incoming low power communications data messages or the battery power or A/C power status of the managed information handling system. The low-power communications engine 340 may forward the inbound low power communication messages, commands, or data to the in-band applications 324 and trigger a BIOS wake event depending on one or more of the factors described in embodiments herein. In other aspects, inbound low power communication messages may be bound for out-of-band applications 345 and the low power communications engine 340 may forward those as appropriate. Forwarding the received low-power communications by the low-power communications engine may require communication with an embedded controller to wake up the BIOS of an information handling system from a sleep state in some cases. To do so consumes power but wake up may be necessary when a managed information handling system is detected to be located at an untrusted location or accessible by untrusted wireless networks in some embodiments. The risk of security compromise may be heightened when a location is classified as untrusted by the environment characteristics analysis engine. Thus, in-band applications are invoked to address the incoming low power data messages with immediacy.

It may not be necessary for all low power communication technology messages or data to be delivered immediately when a managed information handling system is detected at an untrusted location in some embodiments. In some aspects, the incoming low power data messages may also have priority level designations associated with them for critical security messages or less critical priority designations. In some embodiments, only critical priority or high priority messages may be forwarded when the managed information handling system is detected at an untrusted location and accessible to networks with a low location trust level. In other aspects, the power state may impact determination under what circumstances received messages in data packets via WLAN should trigger wake up of the BIOS of the managed information handling system in some embodiments herein.

Figure 4:
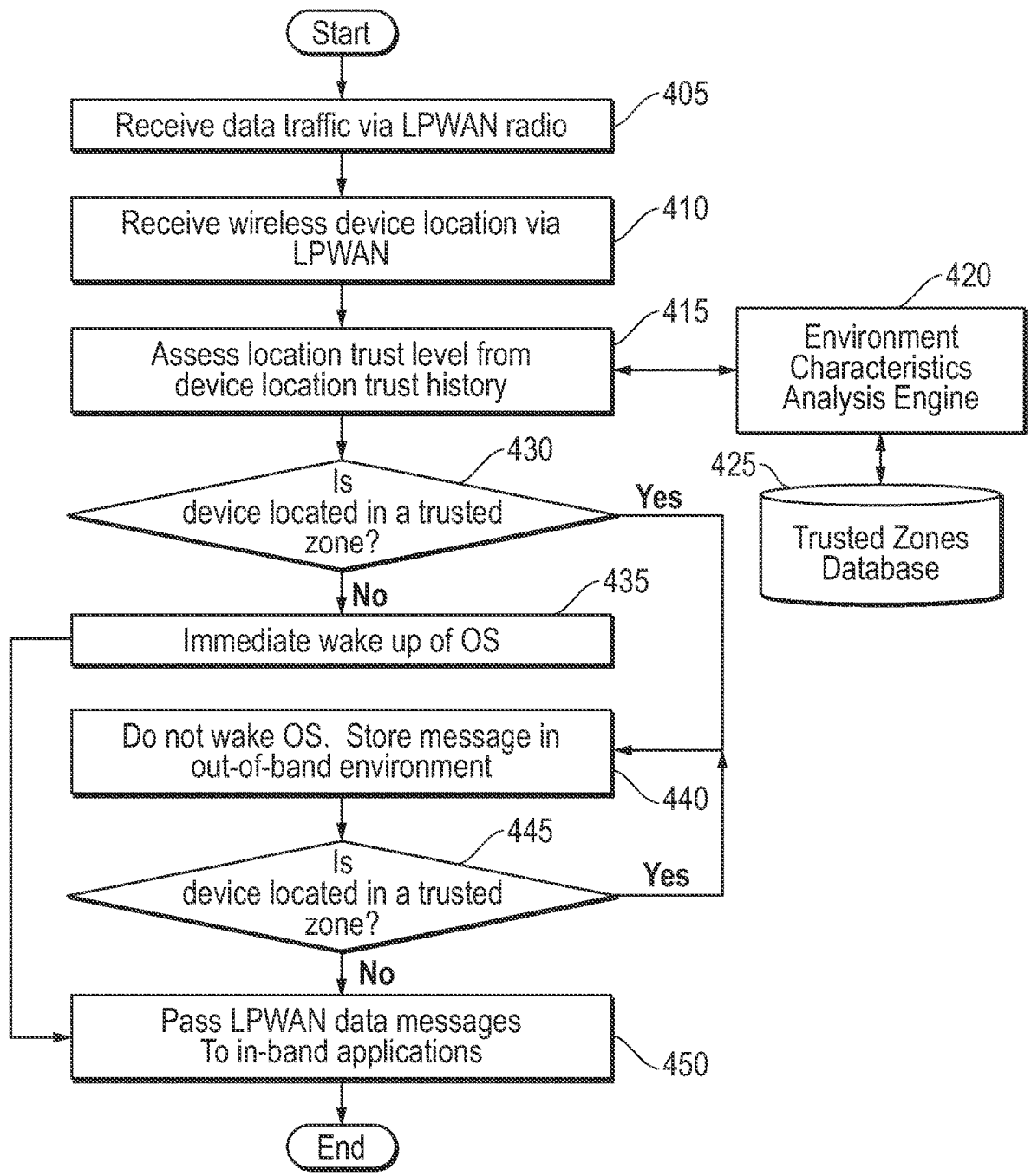
FIG. 4 is a flow diagram illustrating a method of operating a low power (LP) communications engine with location trust analysis according to an embodiment of the present disclosure.

FIG. 4 illustrates a method for directing incoming low power packet data flow via a low-power communications engine (LP communications engine) according to an embodiment. The assessment of managed information handling system location trust classifications, including that of accessible wireless networks at a location in some aspects, may be used alone or with one or more additional factors determine a flow of received low power communication data messages. The location trust classification is assessed via a machine learning system by at least a portion of the environment characteristics analysis engine.

In an example embodiment a low power wireless communication technology protocol may be utilized, such as an LPWAN wireless link, may receive the inbound low power communications data messages. Although LPWAN is referred to in the present embodiment, other low power wireless communication technology protocols may also utilize the embodiments in FIG. 4 and FIG. 5 as will be understood. For example, LoRa, Sigfox, and other IoT low power wireless protocols may be implemented in addition to protocols that may be classified as LPWAN. For simplicity in the embodiments of FIG. 4 and FIG. 5, LPWAN shall refer to any low power wireless communication technology protocol.

The environment characteristics analysis engine may receive data for a particular location and wireless networks as well as factors for user behavior or security posture of a managed information handlings system. These security factors are used as input variables for determining a location trust classification for the detected location as well as other locations. Additionally, the environment characteristics analysis engine may conduct machine learning analysis for setting a location trust level threshold score or curve demarcating a trusted class of locations from an untrusted class of locations. At untrusted locations, received low power data must be forwarded to in-band applications for immediate attention by the managed information handling system. At trusted locations, incoming low power data may be stored locally by the out-of-band low power communications engine and forwarded later. In one example embodiment, one or more LPWAN wireless links may be always-on and available for a mobile information handling system to receive wireless transmissions of low power data packets from an always-on management or security solution, such as Dell Command/Intel vPro Out-of-band or AirWatch solutions as described above. In further embodiments, the low power (LP) communications engine may be used with either an assessment of incoming priority level designations for low power data packets or reported power state data from a power management subsystem to further assist in determining traffic flow of inbound low power data at a managed information handling system.

Some or all of the method of FIG. 4 may be executed via code instructions for an LP communications engine on one or more processors or controllers such as in the wireless interface adapter or a remote management card in an information handling system. As described, a remote management card may be integrated or separate in the information handling system in some embodiments. The remote management card may include logic for a processor and/or controller as well as memory that may operate despite a sleep state, such an ACPI sleep state, being implemented on the information handling system. Other portions of the method of FIG. 5 may be performed on an environment characteristics engine which may be located locally in an out-of-band environment of the remote management card or may be partially located at a remote location accessible by low power wireless link. It is understood that each of the following steps may be performed by the LP communications engine and environment characteristics engine at the managed information handling system entirely at one controller or processor or across several processors or controllers in the out-of-band environment and at the wireless interface adapter. The always-on management or security solutions, such as Dell Command/Intel vPro Out-of-band or AirWatch solutions, may also have some portion performed from a remote location in whole or in part while other portions of the remote management may take place at the managed information handling system.

At 405, the information handling system with an always-on low power wireless communication technology protocol wireless link may receive data packets via a low power wireless communication technology protocol wireless interface adapter. The LPWAN module may receive the data packets and provide those packets to the LP communications engine located in an embedded controller or processor at the LPWAN wireless interface adapter or located at a remote management card at the information handling system. The LP communications engine are code instructions executed in firmware or software at a controller or processor at the remote management card, LPWAN wireless adapter, or some combination. The LP communications engine will receive data packets transmitted via LPWAN including any type of low power wireless communication technology protocol as discussed.

At 410, the LP communications engine will receive managed information handling system location data via an LPWAN wireless link or other low power wireless communication technology protocol wireless link. In other embodiments, the LP communications engine may receive location data from a GNSS, Wi-Fi positioning systems, network location identification, roundtrip time measurements from base stations or access points, enhanced observed time difference determinations, advanced forward link trilateration, triangulation system from base station locations, cell identification systems, or other location systems or hybrid location systems to provide location data including information about accessible wireless networks by a managed information handling system at a location. Further information received may include information about encryption or security status of the wireless networks accessible at a detected location. For example, information about whether one or more networks is a secured or unsecured network may be provided. Other data may include information about whether other types of encryption, firewalls, or other wireless security measures are in place. In some embodiments, the location may be determined by an on-board system such as a GPS system of the managed information handling system.

In some embodiment variations, the LP communications engine may assess priority levels, if indicated, from the header of the inbound low power data packets. The priority levels may indicate a plurality of priority levels or may simply indicate critical priority management or security messages which require immediate attention. For example, updates or status checks may not garner critical priority. In another example, indications or commands to mitigate known ongoing attacks, hacking activity, unauthorized access attempts, or virus activity may be designated a critical designation. The priority designation may be a header value assigned by the management or security services such as an Airwatch® solution or others described in embodiments herein.

In some other embodiments, the LP communications engine may also retrieve power state data from a battery or power module of the information handling system at 410 (not shown). This power state data may have been retrieved before a managed information handling system entered a sleep state or may be retrieved upon receipt of LPWAN communications data packets via the out-of-band operating environment if available in various embodiments. The power state data may include an indication of whether the information handling system is connected to a power source such as an A/C transformer power source. In other embodiments, the power state data may indicate a battery power level. In one optional example embodiment, if the information handling system is indicated as connected to an A/C power source, the LP communications engine may proceed to 435 to wake the BIOS and the information handling system for processing of the data packets via an in-band application immediately since waking the managed information handling system may have limited impact on battery power levels. The remainder of the method of FIG. 4 may be skipped in such an optional embodiment. If the managed information handling system is not connected to A/C power or a battery power level is below a threshold level however, then the remainder of the method of FIG. 4 may be implemented to assess location trust levels in embodiments which utilize power state data.

In a further optional embodiment (not shown), if the LP communications engine at 410 determines that the incoming low power communications are designated with a critical message designation. In such an embodiment, the LP communications engine proceed to 430 and implement the disclosed method of FIG. 4 to trigger a wake command to the BIOS and to forward the received low power communications if a location is classified as untrusted. If the messages are deemed below a critical designation, then flow may proceed to 440 to store the received low power messages regardless of the FIG. 4 assessment of the location trust levels since the lower priority messages can wait until the managed information handling system wakes at a later time. It will be appreciated that both of these are variations involving power status or data priority levels may also be used together in some embodiments. Both are optional variations to the embodiment shown in FIG. 4 which focuses on the determination of location trust levels and classification. One of skill will understand that a variation of FIG. 4 may or may not implement the assessment of either the power status or priority levels as described.

At 415, the LP communications engine may assess a location trust level for the detected location or for LPWAN information received identifying the location of the managed information handling system. The LP communications engine will access managed information handling system location trust history via an environmental characteristics analysis engine 420. The environment characteristics analysis engine at 420 may be responsible for accessing a trusted zones database 425 which may contain an already-derived location trust level rating or trust classification for an identified location. Machine learning may be used to derive a location trust level or classification from several input factors including security factors about number of reported attacks or security compromises at accessible networks at a location. Additional factors include the security, firewall protection, authorization requirements, or encryption used at the accessible networks at a location, currently known risks of viruses or breach attempts, behavioral history of a user at an identified location or on particular networks. In some examples, the type of attack or risk or the type of security implemented may have a rating value to be used as an input into the assessment of trust classification. In an additional embodiment, the location trust level rating may be further based on the security posture of the managed information handling system with respect to data sensitivity on the managed information handling system and sensitivity of systems or data accessible via the managed information handling system. In other embodiments, the location trust level rating or classification as trusted or untrusted may include input variables such as factors relating to the history of behavior of the user of the managed information handling system. The data in the trusted zones database 425 may be limited to history of activity of the managed information handling system, user behavior, and history and status of wireless networks at a plurality of locations previously accessed by the managed information handling system in some embodiments. In other embodiments, the trusted zones database 425 may also include crowd sourced data received by the environment characteristics analysis engine 420 from other information handling systems that have operated in a detected location or on accessible networks at a detected location. As described, the environment characteristics analysis engine 420 and trusted zones database 425 may be local in some embodiments or may be a hybrid of local and remote operation. Remote accessibility by the out-of-band system and LP communications engine may be conducted through low power communication technology protocol wireless links according to several embodiments described herein including LPWAN links.

Determination of the location trust level score may be implemented with a machine learning system which may assess each or some portion of the several factors described in embodiments herein as variable inputs. The factors may have values such as number of occurrences within a period of time or ratings on severity of occurrences. Further, security posture factors may have values or ratings assigned including a value indicating a security measure is present or not in some embodiments. In some machine learning algorithmic analysis, the data for the various input variables of the security factors may be normalized. In other aspects, iterative weighting may be applied to the various factors to train an artificial neural network or decision tree such that some security factor variables will be deemed to have greater importance in the security consideration. In yet other embodiments, the weighting values may be adjusted in response to desired levels of security desired by an IT manager or designer as balanced with the interest of preservation of battery power.

The environment characteristics analysis engine may apply one or more applications of machine learning algorithms to map input variables of the plural security factors described herein to an output variable via a learned target function. An example output variable may be the location trust level or score or in a classification machine learning algorithm it may be a designated classification. For example, predictive analytics may be employed to predict a risk level of security compromise based on input factors including history of attacks in networks available at a detected location, secured versus unsecured status of the networks at the location, authorization or subscription requirements to access the networks at the location, the security posture factors of the managed information handling system, and the user behavior in wireless network access history at the detected location. A plurality of these factors is implemented in one or more machine learning algorithms to yield a prediction of risk of compromise or attack against a managed information handling system at the detected location; in other words, the location trust level. It will be understood that the factors listed immediately above each often include a plurality of sub-factors which may be treated as individual input variables for the machine learning algorithm. In one example embodiment, a binary classification determination may need to be made between a trusted location and an untrusted location. Any machine learning algorithm suitable for binary classification analysis may be used in such an example embodiment. Other machine learning techniques may also be used to determine a plurality of location trust levels for locations and designate a threshold between trusted and untrusted classifications. For each location visited by a managed information handling system, the determination may be made of a location trust level or score by the environment characteristics analysis engine to classify the detected location and available wireless networks as trusted or untrusted.

Example machine learning algorithms used for such an analysis may include logistic regression techniques, linear discriminant analysis, linear regression analysis, artificial neural networks, or classification/regression trees in some embodiments. In an example embodiment, machine learning classifier algorithms may be employed to determine a classification of a location and its available wireless networks as trusted or untrusted. A location trust level score may refer to the derived location trust value for a particular location based on the plurality of input security variable discussed in embodiments herein relative to classification of that location within either a trusted or untrusted classification.

In various other embodiments, machine learning systems may employ Naïve Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a score from an input factor dataset such as the security factors described herein and classifying a detected location as trusted or untrusted. Several of these latter algorithms may establish a model with training data for utilization by the environment characteristic engine. Boosting may be used with decision trees in one aspect whereas learning vector quantization may be used with artificial neural network algorithms. There are a variety of machine learning paradigms available for classification prediction with a plurality of variable such as those described in the embodiments of the environment characteristics analysis engine herein.

Certain algorithms may require additional computing resources not available at an out-of-band processing system such as a network management card. In some embodiments, determination of location trust level scores and consequent classification as trusted or untrusted may be conducted in whole or in part at a remote location. Then the classification or score for a location may be transmitted via low power wireless communication technology protocol link to the local agent for an environment characteristic analysis engine 420 on the managed information handling system. Such trusted or untrusted classifications or location scores may be then stored in a local memory of a trusted zones database 425. In other embodiments, the computational requirements are not as high and deriving the location trust level score for classification as trusted or untrusted for a plurality of locations may take place on the managed information handling system in the out-of-band environment. For higher computational requirements such as training an artificial neural network or decision tree with sample data, the managed information handling system may also conduct such processing during and awake state. Then a trained neural network may be implemented in the out-of-band environment with reduce processing capacity. In some embodiments, training neural networks, decision trees, or conducting other computation groundwork of a machine learning classifier according to various algorithms may occur when the managed information handling system is in an awake state or may occur remotely. Then a simplified, trained classifier framework may be stored for simplified analysis computations by an out-of-band environment processor or controller operating the environment characteristics analysis engine locally.

It may be beneficial to conduct the machine learning analysis for locations at the managed information handling system, for example, if data collected on factors relates more closely to the specific managed information handling system and are stored locally. If those locally stored data factors take priority in the analysis over crowdsourced reporting, local machine learning analysis may be beneficial to avoid the need for remote communication. For example, the history of attack attempts at the locations visited by the managed information handling system, the user network behavior history, and the security posture of the managed information handling system for sensitivity of stored data or access to sensitive systems or network may recorded and stored locally as the managed information handling system is utilized over time. If these security factor variable become priority factors in the classification operation, local processing, then it may be more efficient to derive classification as trusted or untrusted at a local remote management card in out-of-band processing.

Flow may then proceed to 430 where the LP communications engine and environment characteristics engine determine whether the derived location trust level falls within a trusted or untrusted categorization. For example, the location trust level may above or below a threshold location trust level score or set of matrix values delineating between categories as determined via a machine learning categorization algorithm in various embodiments. In this way the environment characteristics engine may determine if a location or accessible networks at a detected location may be designated as a trusted location or an untrusted location. If the LP communications engine determines the managed information handling system is in an untrusted location, for example in a physical location where one or more risky wireless networks are accessible by the managed information handling system, then flow may proceed to 435. Wireless network accessibility may include being within range of an access point or base station, having the capability to communicate on the wireless network, or having subscription accessibility to a wireless network. These are example characteristics that may define a location according to some embodiments herein. If the LP communications engine determines the managed information handling system is in a trusted location, for example in a physical location known to be physically secure with controlled access to wireless networks requiring authorization or subscription of having otherwise sufficient security measures in place, then flow may proceed to 440.

At 435, the LP communications engine may forward a wake command via an embedded controller to the BIOS to wake the operating system and the managed information handling system. To wake the operating system will enable the in-band applications operating thereon to receive low power communications protocol data messages and address the requirements of the instructions, data, updates, or the like contained in those inbound low power data packets. In an example embodiment, low power packets may be received to disable a Wi-Fi or other wireless network capability or bar wireless networks that are unsecured at the location. Other instructions, requirements, data or the like are contemplated in accord with the always-on management or security solutions, such as Dell Command/Intel vPro Out-of-band, Dell Management Engine, or AirWatch solutions. Proceeding to 450, the LP communications engine may pass the received LPWAN data packets to the in-band applications of the managed information handling system for immediate in-band processing in one aspect of the present embodiment. In this way, the managed information handling system detected at a location or accessible by wireless networks at the detected location having a lower location trust level than a threshold level of trust may immediately address incoming low power communication data messages. In some aspects, the LP communications engine may forward low power wireless communications protocol data messages to an awakened in-band applications to implement controls or other requirements resulting from the received LPWAN data packets.

Returning to 430, in some embodiments, the LP communications engine may assess power battery levels or A/C power connection status or may assess priority level designations of the incoming low power data packets before proceeding to 435. For example, in the optional embodiment, which is not specifically shown in FIG. 4, the managed information handling system may be in a trusted location at 430, but there is a determination by the LP communications engine that the information handling system is connected to A/C power or the battery power status is at or above some threshold battery power level. Then the LP communications engine may instead proceed to 435 to immediately wake the BIOS and the managed information handling system since preservation of power or battery level may not be as important. In other words, below a certain battery power level, assessment of a trusted or untrusted location may be made before triggering a wake command to BIOS in some embodiments. In such a case, the receive low power communications technology protocol data messages may be promptly passed to in-band applications although the managed information handling system is detected in a trusted zone.

In another optional embodiment not specifically depicted in FIG. 4, the received low power communications technology protocol data packets may include a priority designation. For example, the managed information handling system is detected in an untrusted location at 430, but the data packets may not be of sufficiently critical designation. Then the LP communications engine may not proceed to 435 to trigger a wake command to BIOS, but instead proceed to 440 and store the received low power messages which may be resolved at a later time without needing to wake the BIOS and immediately pass the received low power data messages having a lower priority. In other words, only incoming low power data packets with a critical designation will trigger a wake command to BIOS at 435 if the managed information handling system is in an untrusted location in some embodiments. As described in various example embodiments, the always-on management or security solutions, such as Dell Command/Intel vPro Out-of-band, Dell Management Engine, or AirWatch solutions may provide provisioning instructions, updates, security alerts and commands for remote management of peripheral systems, or other remote commands such as security alerts and measures required in example embodiments. For example, the Dell Command/Intel vPro Out-of-band always-on management or security solution will provide for out-of-band controls, data, instructions, or the like to a remote management card for implementation of such controls, data, or instructions thereon. Depending on the priority level of the instruction, command, or data provided via the LPWAN data packets received, the out-of-band remote management card may send a wake command to the BIOS and operating system of the managed information handling system to implement changes or adjustments required by the received data packets. For example, low power data packets received to address critical security matters such as critical patches to firewalls, wireless access controls, or other security related matters intended to thwart unauthorized accesses may be deemed with a critical designation needing immediate attention in some embodiments. In another embodiment, the always-on management or security solution may be an in-band application such as AirWatch. The received LPWAN data packets must be elevated to the operating system of the information handling system and a wake command request must be sent to the BIOS, thus the system must wake the managed information handling system.

At 440, if the managed information handling system is detected at a trusted location, the LP communications engine embedded controller may not be triggered to wake BIOS. Instead, the LP communications engine may direct the incoming low power communications technology data messages to be stored in a local memory of the out-of-band system in some embodiments. For example, a buffer or addressable memory on the remote management card may be used in some embodiments to store the incoming low power data messages for later elevation to in-band applications. In some other embodiments when the managed information handling system is in a trusted location (or are of sufficiently low priority in some optional embodiments), the received incoming low power data packets may be ignored or discarded instead of stored. In the embodiment of FIG. 4, the low power data packets are shown as being stored for later elevation to in-band applications.

Proceeding to 445, the LP communications engine will continue to monitor the managed information handling system location. If the managed information handling system is detected to have been moved to an untrusted location at 445, the LP communications engine may trigger a wake command to BIOS and flow will proceed to 450 where the stored low power communications data messages may be passed to in-band applications. If the managed information handling system is detected to remain in a trusted location at 445, the flow may return to 440 where the BIOS is not awakened and the messages continue to be stored. The LP communications engine may continue to monitor the location trust level of the managed information handling system. In some embodiments, such as described further with respect to FIG. 5, stored low power communication data packets at 440 may also be passed to in-band applications upon detection of other events causing a wake command to BIOS such as a user log in. In yet other embodiments, detection of an event such as connection to an A/C power source may trigger a wake command and elevation of stored low power communication data packets store on the remote management card to in-band applications. After passing the low power communication technology protocol data messages to in-band applications operating on an awakened managed information handling system at 450, the process may end.

It is understood that the methods and concepts described in the algorithm above for FIG. 4 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments.

Figure 5:
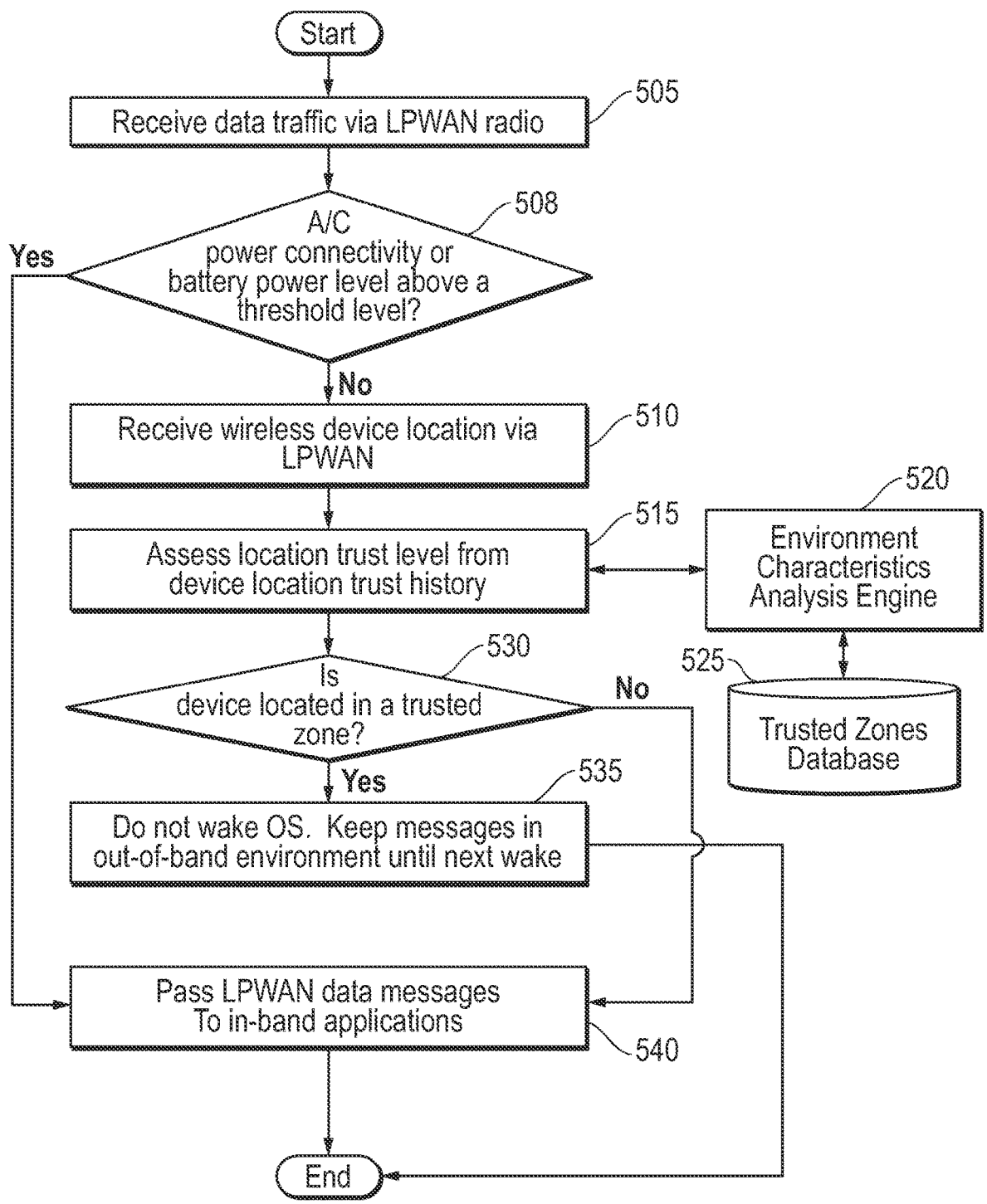
FIG. 5 is another flow diagram illustrating a method of operating a low power (LP) communications engine with location trust analysis according to another embodiment of the present disclosure.

FIG. 5 illustrates another method for directing incoming low power packet data flow via a low-power communications engine according to an embodiment. The receipt of incoming low power wireless communication technology protocol data traffic and assessment of managed information handling system location, including accessible wireless networks at a location, may be used with one or more additional factors determine a location trust level via a machine learning system of an environment characteristics analysis engine. As explained, although LPWAN is referred to in the present embodiment of FIG. 5, other low power wireless communication technology protocols may also utilize the embodiments in either FIG. 4 or FIG. 5 as will be understood. For example, LoRa, Sigfox, and other IoT low power wireless protocols may be implemented in addition to low power protocols that may be classified as LPWAN. As stated, in the embodiments of FIG. 4 and FIG. 5, LPWAN may refer to any low power wireless communication technology protocol for simplicity of explanation.

Some or all of the method of FIG. 5 may be executed via code instructions for an LP communications engine on one or more processors or controllers such as in the wireless interface adapter or at a remote management card in a managed information handling system. Some portions of the disclosed system embodiments may also operate remotely as described. As described, a remote management card may be integrated or separate in the information handling system in some embodiments. The remote management card may include logic for a processor and/or controller as well as memory that may operate despite a sleep state, such an ACPI sleep state, being implemented on the information handling system. Other portions of the method of FIG. 5 may be performed on an environment characteristics engine which may be located locally in an out-of-band environment of the remote management card or may be partially located at a remote location accessible by low power wireless link. It is understood that each of the following steps may be performed by the LP communications engine and environment characteristics engine at the managed information handling system entirely at one controller or processor, or across several processors or controllers in the out-of-band environment. The environment characteristics analysis engine may receive data for a location and wireless networks at that location as well as factors for user behavior or security posture of a managed information handlings system for use with determining location trust levels. The environment characteristics engine may determine location trust levels for the detected location as well as other locations and store such ratings in a local database accessible via out-of-band operations of a managed information handling system. The always-on management or security solutions, such as Dell Command/Intel vPro Out-of-band, Dell Management Engine, or AirWatch solutions, may also have some portion performed from a remote location in whole or in part while other portions of the remote management may take place at the managed information handling system.

At 505, the information handling system with an always-on low power wireless communication technology protocol wireless link may receive data packets via a low power wireless communication technology protocol wireless interface adapter. The LPWAN module may receive the data packets and provide those packets to the LP communications engine located at an embedded controller or processor of the LPWAN wireless interface adapter or a remote management card. The LP communications engine will receive data packets via any type of low power wireless communication technology protocol including LPWAN as discussed.

Proceeding to 508, the LP communications engine may determine, from a power management subsystem, the A/C power connection status or battery power level of the managed information handling system. In various embodiments, the LP communications engine may access previously-stored data or actively retrieve data from the power management subsystem indicating power status or battery power level of the managed information handling system. If the LP communications engine determines the managed information handling system is connected to A/C power or the battery power level is above a threshold battery power level, the flow may proceed to 540. At 540, the LP communications engine may trigger a wake command via embedded controller to the BIOS of the managed information handling system and pass the received low power communications technology protocol messages to in-band applications. When the managed information handling system is connected to an A/C power source or the battery power level is above a specified threshold value, the energy cost of waking the BIOS to handle the inbound low power communications messages may not be as detrimental in some embodiments. For example, a battery power level threshold may be set at 60%, however it is understood that any battery power level threshold value may be used in various embodiments.

As described in another optional embodiment, the LP communications engine may also determine whether the inbound low power communication technology protocol messages are designated with a minimal level of priority at 508 as well. If designated as at or above a priority designation, then the LP communications engine will determine if triggering a wake command to BIOS is warranted according to embodiments disclosed in FIG. 5. For low power data messages with a lower priority designation than the threshold priority, flow may proceed to 535 (not shown) where messages may be stored in some embodiments until another event wakes the BIOS.

If the LP communications engine determines the managed information handling system is not connected to A/C power or the battery power level is below a threshold battery power level at 508, the flow may proceed to 510. At 510, the LP communications engine will receive location data about the managed information handling system via an LPWAN wireless link or other low power wireless communication technology protocol wireless link in some embodiments. In other embodiments, the LP communications engine may receive location data from a GNSS, Wi-Fi positioning systems, network location identification, roundtrip time measurements from base stations or access points, enhanced observed time difference determinations, advanced forward link trilateration, triangulation system from base station locations, cell identification systems, or other location systems or hybrid location systems. In some embodiments, the location may be determined by an on-board system such as a GPS system of the managed information handling system for example. In addition to location data, information about wireless networks at the location accessible by a managed information handling system at a location. Accessibility may include those networks with base stations or access points within range, and those having compatible radio technology, authorization, subscriptions, or the like with the managed information handling system. Further information received about networks may include information about encryption or security status of the wireless networks accessible at a detected location. For example, information about whether one or more networks is a secured or unsecured network may be provided. Other data may include information about whether other types of encryption, firewalls, or other wireless security measures are in place.

At 515, the LP communications engine may assess a location trust level for the determined location of the managed information handling system. The LP communications engine will access managed information handling system location trust history via an environmental characteristics analysis engine 520 similar to the description of several embodiments herein. The environment characteristics analysis engine at 520 may be responsible for accessing a trusted zones database 525 which may contain one or more already-learned location trust level ratings or categorizations in some embodiments. In other embodiments, the trusted zones database may contain data so that the location trust level ratings or categorization may be derived by the environment characteristics engine. Several factors for an identified location may be used by machine learning to derive the location trust level score (or trust category) including reported attacks or security compromises at accessible networks at a location factored in with the security employed at the accessible networks at the detected location. Additional factors, for example, include the security, firewall protection, authorization requirements, or encryption used at the accessible networks at a location, currently known risks of viruses or breach attempts, behavioral history of a user at an identified location or on particular networks. In an additional embodiment, the location trust level rating may be further based on the security posture of the managed information handling system. The security posture may include consideration of data sensitivity of data stored on the managed information handling system and sensitivity of systems or data accessible within a secured network such as an enterprise network via the managed information handling system. In some embodiments, these factors relating to data or system access sensitivity of a managed information handling system may be set by an IT administrator for example. The location trust level rating threshold between trusted and untrusted locations or networks may distinguish categories partially based on the security posture of the managed information handling system or the history of behavior of the user of the managed information handling system.

The data in the trusted zones database 525 may be limited to history of activity of the managed information handling system in some embodiments or may also include crowd sourced data received by the environment characteristics analysis engine 520 from a remote location. The crowd source location history data may be received form reports about other information handling systems that have operated in the detected location or on accessible networks at a detected location. In some embodiments, these other information handling systems may be similarly situated to the managed information handling system with respect to security posture, capabilities, or other operational attributes such as in-band and out-of-band processing capabilities or the like.

As described in several embodiments herein, the environment characteristics analysis engine 520 and trusted zones database 525 may be local to a remote management card of the managed information handling system in some embodiments or it may be a hybrid of local and a remotely-accessible processing and memory. Remote access of a portion of the environment characteristics analysis engine 520 and trusted zones database 525 may be available to the out-of-band system and LP communications engine via low power communication technology protocol wireless links in some aspects. In one embodiment, the local memory environment characteristics analysis engine 520 and trusted zones database 525 may store already-derived location trust level scores or categories for a plurality of locations. Analysis of the machine learning to determine the location trust categorizations may be conducted at a remote location for a portion of environment characteristics analysis engine 520 and draw location characteristics data from a remotely stored portion of the trusted zones database 525.

Determination of the location trust level score may be implemented with a machine learning system of the environment characteristics engine 520 which may assess each or some portion of the several factors described in embodiments herein. Weighting and normalization of factors may be applied to the various data reported about a location, and these weighting values may be adjusted depending on the level of security desired by an IT manager or designer versus the need for preservation of battery power or power savings. Machine learning algorithms similar to that described above for FIG. 4 may be utilized to determine a location trust level score for purposes of classification of a location and accessible wireless networks as trusted or untrusted. A plurality of security input variables, as discussed in embodiments herein, may be input into a binary classification machine learning algorithm by the environment characteristics engine for example.

Flow may then proceed to 530 where the LP communications engine and environment characteristics engine determine whether the derived location trust classification at 514 for a location or its accessible networks are designated as a trusted location or an untrusted location. If the LP communications engine determines the managed information handling system is in an untrusted location, then flow may proceed to 540. If the LP communications engine determines the managed information handling system is in a trusted location, then flow may proceed to 535.

At 540, the LP communications engine may forward a wake command via an embedded controller to the BIOS to wake the operating system and the managed information handling system. The LP communications engine may then forward the received low power communication technology protocol data messages to the in-band applications operating on the managed information handling system. This provides for immediate attention to the low power communications protocol data messages by the in-band applications address the requirements of those inbound low power data packets. In an example embodiment, low power packets may be received to limit access to one or more wireless communication networks based on risk known or anticipated at the untrusted location. Other examples may include software patches for immediate implementation to prevent unauthorized accesses to the managed information handling system. Various other instructions, requirements, data or the like are contemplated in accord with the always-on management or security solutions, such as Dell Command/Intel vPro Out-of-band, Dell Management Engine, or AirWatch solutions. At this point the process may end although the LP communication engine will continue monitoring low power communications during sleep states.

At 535, if the managed information handling system is detected at a trusted location, the LP communications engine embedded controller does not trigger a BIOS wake event. Instead, the LP communications engine may direct the incoming low power communications technology data messages to be stored in a local memory of the out-of-band system in some embodiments. For example, a buffer or addressable memory on the remote management card may be used in some embodiments to store the incoming low power data messages for later elevation to in-band applications. In some other embodiments when the managed information handling system is in a trusted location, the received incoming low power data packets may be ignored or discarded instead of stored. If stored, the low power data packets may be elevated to in-band applications upon a later wake event of BIOS occurring for a different reason. For example, a user log-in, a remote action requiring a BIOS wake event, or the LP communication engine determines the managed information handling system has been transported to an untrusted location. If the received low power communications are discarded or ignored at 535, the managed information handling system will rely on the always-on management or security solutions, such as Dell Command/Intel vPro Out-of-band, Dell Management Engine, or AirWatch solutions resending the data packets at a later time or upon request by in-band applications upon the next wake event.

At this point the process may end although the LPWAN communications engine will continue to monitor location, sleep state indicators, power state indications, and LPWAN communications for determination of passing in-band or out-of-band communications received via the LPWAN wireless interface adapter. With the above embodiments, improved power conservation and power management may be realized while supporting always-on remote management or security solution communications via LPWAN wireless links according to the embodiments of the present disclosure.

It is understood that the methods and concepts described in the algorithms above for FIGS. 4 and 5 may be performed in any sequence or steps may be performed simultaneously in some embodiments. It is also understood that in some varied embodiments certain steps may not be performed at all or additional steps not recited in the above figures may be performed. It is also contemplated that variations on the methods described herein may also be combined with portions of any other embodiments in the present disclosure to form a variety of additional embodiments. For example, aspects of FIGS. 4 and 5 may be modified as understood by those of skill to implement variations described therein from either figure embodiment.

In some embodiments, dedicated hardware implementations such as application specific integrated circuits, programmable logic arrays and other hardware devices can be constructed to implement one or more of the methods described herein or portions of one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as an Intel® Core™ or ARM® RISC brand processors, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a wireless adapter configured to communicate on a low power communication technology network (LPWAN) for transmitting LPWAN data traffic for at least one always-on remote management service for the information handling system;
a processor to receive location status of a client information handling system and to execute code instructions for a low power communications machine learning engine configured to assess a location trust level of whether the location is a trusted zone location or an untrusted zone location based on data relating to history of activity at the location from reported operational or network activity; and
the processor to send a command to trigger an embedded controller at the client information handling system to wake a basic input/output operating system (BIOS) of the information handling system and forward LPWAN data traffic to in-band applications on the information handling system if the client information handling system location is determined to be in the untrusted zone location; and
the processor to store LPWAN data traffic in an out of band environment to be transmitted at a later time when an indication is received that the client information handling system enters a next wake mode if the client information handling system location is determined to be in the trusted zone location.

2. The information handling system of claim 1 wherein the reported operational or network activity includes reports of security attacks reported on a network or at a location and secured or unsecured status of a wireless network at the location.

3. The information handling system of claim 1, further comprising:
the processor to assess the location trust level of whether the location is the trusted zone location or the untrusted zone location based on assessment of a security posture of the information handling system including sensitivity of enterprise data accessible by the information handling system and security required for access to the information handling system.

4. The information handling system of claim 1, further comprising:
the low power communications engine to pass the low power communication technology data traffic to in-band applications on the information handling system.

5. The information handling system of claim 1 wherein the always-on remote management service includes a security service and alert messages pertaining to a security compromise which are forwarded to the in-band application when the information handling system is the untrusted zone location for immediate attention by the in-band application.

6. The information handling system of claim 1 wherein the reported operational or network activity includes reports of high-risk network activity by a user of the information handling activity.

7. The information handling system of claim 1, further comprising:
a memory operatively connected to the low power communications engine to store a database of location or network trust level grading based on learned environment characteristics from reports on history of activity at a plurality of locations or networks and further including reports on history of activity crowd-sourced from similar classes of devices as the information handling system.

8. A computer implemented method comprising:
receiving low power communication technology network data traffic for at least one always-on remote management service for a managed information handling system via a wireless adapter operating via a low power communication technology network wireless link;
receiving location status of the managed information handling system;
executing code instructions, via a processor, for a low power communications machine learning engine configured to assess a location trust level of whether the location status is a trusted zone location or an untrusted zone location based on data relating to history of activity at the location from reported operational or network activity and on assessment of a security posture of the information handling system including sensitivity of enterprise data accessible by the information handling system and security required for access to the information handling system; and
triggering an embedded controller to wake a BIOS of the managed information handling system and forward the incoming low power communication technology data traffic to an in-band application on the managed information handling system if the managed information handling system is determined to be in the untrusted zone location to implement immediate security or management measures.

9. The method of claim 8, further comprising:
ignoring the received low power communication technology data traffic if the information handling system is in a trusted zone; and
storing ignored low power communication technology data traffic in a memory via the low power communications engine.

10. The method of claim 9, further comprising:
forwarding the low power communication technology data traffic to the in-band application of the managed information handling system upon the next wake of the managed information handling system from a sleep state.

11. The method of claim 8 wherein the always-on remote management service includes a security service and alert messages pertaining to a security compromise which are forwarded to the in-band application when the managed information handling system is not in the trusted zone location for immediate attention by the in-band application.

12. The method of claim 8 wherein the low power communication technology network utilizes a low power wide area network (LPWAN) protocol.

13. The method of claim 8 wherein the low power communication technology network utilizes a LoRa, Sigfox, or other low power IoT wireless protocol.

14. The method of claim 8 wherein the low power communications engine accesses a database of location trust level grading at an environment characteristics analysis engine via a low-power communication wireless link to determine if the information handling system is in one trusted zone location or not.

15. The method of claim 8, wherein an environment characteristics analysis engine utilizes machine learning to designate a detected location as the untrusted zone location based on a plurality of factors including reported levels of security attacks within a period of time, security of one or more wireless networks at the detected location, or a history of risky wireless data operations by a user at the detected location.

16. An information handling system comprising:
a wireless adapter for communicating on a low power communication technology network for receiving and transmitting low power communication technology network data traffic for operating an always-on remote management service;
a remote management card executing code instructions via a controller for a low power communications machine learning engine to manage low power communication technology network data traffic;
the controller executing the low power communications machine learning engine to assess whether a detected location of the information handling system is categorized as a trusted zone location or an untrusted zone location from a location trust level provided by an environment characteristics analysis engine and adjusted such that determination of whether the detected location is trusted or untrusted depends on assessment of a security posture of the information handling system including sensitivity of enterprise data accessible by the information handling system and security required for access to the information handling system; and
the low power communications engine to determine whether to wake a basic input/output operating system (BIOS) of the information handling system depending on whether the detected location is one trusted zone location or one untrusted zone location.

17. The information handling system of claim 16, further comprising:
the low power communications engine to determine whether to wake BIOS of the information handling system depending on whether the information handling system is connected to a power source or has battery power above a threshold level.

18. The information handling system of claim 16, further comprising:
the controller to wake the BIOS of the information handling system and forward LPWAN data traffic to in-band applications on the information handling system if the detected location of the client information handling system is determined to be categorized as the untrusted zone location.

19. The information handling system of claim 16 wherein the low power communication technology network is a low power wide area network (LPWAN) protocol for LTE Category Narrow Band 1 (LTE NB-IOT) wireless links.

20. The information handling system of claim 16 wherein the low power communications engine operates via an out-of-band operating system.

* * * * *